(12) United States Patent
Takai

(10) Patent No.: US 9,225,506 B2
(45) Date of Patent: Dec. 29, 2015

(54) RECEIVING APPARATUS FOR DIFFERENTIAL SIGNALS

(71) Applicant: Panasonic Intellectual Property Management Co., Ltd., Osaka (JP)

(72) Inventor: Yasumichi Takai, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/711,779

(22) Filed: May 14, 2015

(65) Prior Publication Data

US 2015/0341160 A1  Nov. 26, 2015

(30) Foreign Application Priority Data

May 22, 2014  (JP) .................................. 2014-106394

(51) Int. Cl.
*H03D 1/04* (2006.01)
*H04L 7/00* (2006.01)
*H04L 25/08* (2006.01)

(52) U.S. Cl.
CPC ............ *H04L 7/0087* (2013.01); *H04L 7/0041* (2013.01); *H04L 25/085* (2013.01)

(58) Field of Classification Search
CPC ..... H04L 27/2647; H04L 1/20; H04L 1/0003; H04L 1/0071; H04L 5/0007; H04L 1/0009; H04L 27/0008; H04N 5/4401; H04B 1/30; H04B 1/28; H04B 1/1027; H04B 1/123; H04B 1/1036

USPC .................................. 375/346, 316, 219, 295
See application file for complete search history.

(56) References Cited

U.S. PATENT DOCUMENTS 5,576,842 A * 11/1996 Choi ........................ H04N 5/93
360/32
2011/0221491 A1   9/2011 Shibasaki et al.

FOREIGN PATENT DOCUMENTS

| JP | 2002-512468 | 4/2002 |
|----|-------------|--------|
| JP | 2011-193039 | 9/2011 |
| WO | 99/55000 | 10/1999 |

* cited by examiner

*Primary Examiner* — Zewdu Kassa
(74) *Attorney, Agent, or Firm* — Wenderoth, Lind & Ponack, L.L.P.

(57) ABSTRACT

A receiving apparatus includes a differential amplifier and a logic circuit. The differential amplifier is adapted to receive differential signals having been differentially converted to single-ended convert the received differential signals into a single-ended signal. The logic circuit is adapted to: ternary discriminate an amplitude level of the single-ended signal at a first ternary discrimination timing; ternary discriminate an amplitude level of the single-ended signal at a second ternary discrimination timing; binary discriminate an amplitude level of the single-ended signal at the first binary discrimination timing, by using results of the ternary discriminations of the amplitude level of the single-ended signal at the first ternary discrimination timing and the second ternary discrimination timing; and output a binary signal corresponding to the binary discrimination.

14 Claims, 7 Drawing Sheets

FIG. 3

| COMPARISON RESULT SIGNAL FROM FIRST COMPARATOR 3 | COMPARISON RESULT SIGNAL FROM SECOND COMPARATOR 4 | TERNARY SIGNAL |
|---|---|---|
| H | H | H |
| L | H | M |
| L | L | L |

FIG. 4

| TIMING | TERNARY LOGIC | | BINARY LOGIC |
|---|---|---|---|
| | X | Y | B |
| | L | L | 0 |
| | L | M | 0 |
| | L | H | – |
| | M | L | 0 |
| | M | H | 1 |
| | H | L | – |
| | H | M | 1 |
| | H | H | 1 |

FIG. 5

| TIMING | TERNARY LOGIC | | | BINARY LOGIC | |
|---|---|---|---|---|---|
| | W | X | Y | A | B |
| | L | M | M | 0 | 1 |
| | H | M | M | 1 | 0 |

FIG. 6

| TIMING | TERNARY LOGIC | | | BINARY LOGIC | |
|---|---|---|---|---|---|
| | W | X | Y | A | B |
| | X | L | L | X | 0 |
| | X | L | M | X | 0 |
| | X | L | H | X | — |
| | X | M | L | X | 0 |
| | L | M | M | 0 | 1 |
| | H | M | M | 1 | 0 |
| | X | M | H | X | 1 |
| | X | H | L | X | — |
| | X | H | M | X | 1 |
| | X | H | H | X | 1 |

RECEIVING APPARATUS FOR DIFFERENTIAL SIGNALS

BACKGROUND

1. Technical Field

The present disclosure relates to a receiving apparatus that binary discriminates differential signals having been differentially converted.

2. Description of the Related Art

A conventional digital binary signal receiving apparatus discriminates a signal, in synchronism with a clock signal, and determines for the signal a voltage level V0 corresponding to logical value 0 or a voltage level V1 corresponding to logical value 1. However, along with the increase of the speed of digital data transmission in recent years, there becomes apparent an issue that a discrimination timing is displaced due to skew of data between signals or that a quality of signal is deteriorated due to a differential signal skew between differential signals (the difference between arrival timings, from a transmitter to a receiver, of the positive signal and the negative signal). On the other hand, Japanese Patent No. 4,064,630 discloses a low voltage differential receiver that is equipped with a circuit for adjusting the skew between a data signal and a clock signal, for example. Further, Unexamined Japanese Patent Publication No. 2011-193039 discloses a receiving circuit in which an error rate with respect to a signal quality is reduced by an over-sampling technique that keeps the sampling number constant for one unit interval.

SUMMARY

One non-limiting and exemplary embodiment provides a receiving apparatus that can binary discriminate differential signals having a large skew.

In one general aspect, the techniques disclosed here feature a receiving apparatus including a differential amplifier and logic circuit. The differential amplifier is adapted to receive differential signals having been differentially converted to single-ended convert the received differential signals into a single-ended signal. The logic circuit is adapted to: ternary discriminate an amplitude level of the single-ended signal at a first ternary discrimination timing that is between a first binary discrimination timing included in a plurality of binary discrimination timings at one unit interval and a timing one unit interval prior to the first binary discrimination timing; ternary discriminate an amplitude level of the single-ended signal at a second ternary discrimination timing that is between the first binary discrimination timing and a timing one unit interval after the first binary discrimination timing; binary discriminate an amplitude level of the single-ended signal at the first binary discrimination timing, by using the results of the ternary discriminations of the amplitude level of the single-ended signal at the first ternary discrimination timing and the second ternary discrimination timing; and output a binary signal corresponding to the result of the binary discrimination.

A receiving apparatus according to the present disclosure is effective in binary discrimination of differential signals having a large skew.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 3 is a table showing a relationship between a first comparison result signal and a second comparison result signal input to logic circuit 7 of FIG. 1 and a ternary signal converted based on the first comparison result signal and the second comparison result signal;

FIG. 4 is a table showing a relationship between ternary signals at ternary discrimination timings X and Y, and binary signals determined based on the ternary signals;

FIG. 5 is a table showing a relationship between ternary signals at ternary discrimination timings X, Y and W, and binary signals determined based on the ternary signals;

FIG. 6 is a table showing a relationship between ternary signals at the ternary discrimination timings X, Y and W, and binary signals determined based on the ternary signals;

DETAILED DESCRIPTION

Figure 1:
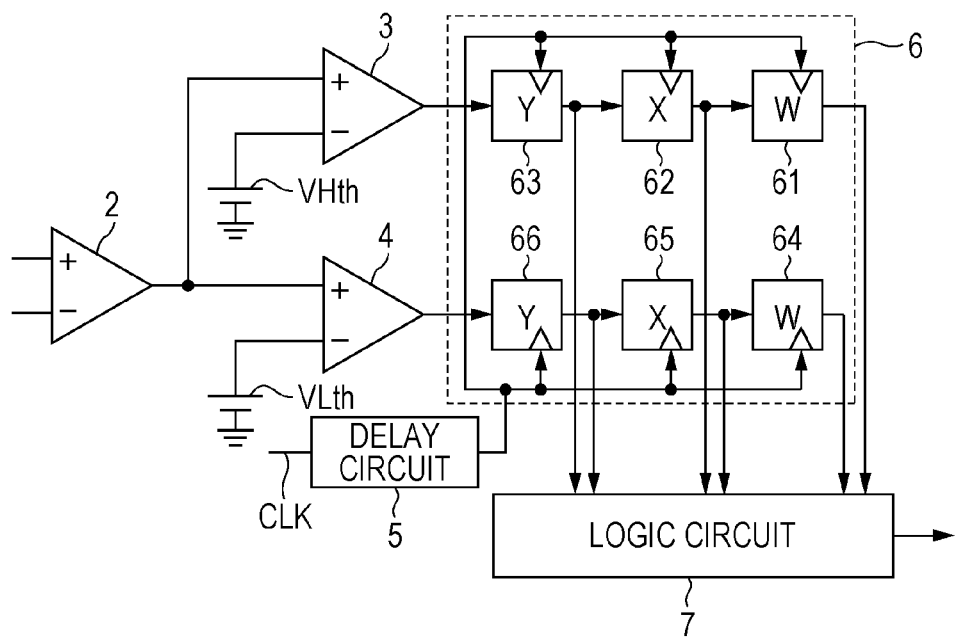
FIG. 1 is a block diagram showing structural elements of receiving apparatus 1 according to a first exemplary embodiment of the present disclosure.

A receiving apparatus according to an embodiment of the present disclosure includes a differential amplifier and a logic circuit. The differential amplifier receives differential signals having been differentially converted and single-ended converts the received differential signals into a single-ended signal. The logic circuit performs: ternary discrimination of an amplitude level of the single-ended signal at a first ternary discrimination timing that is between a first binary discrimination timing included in a plurality of binary discrimination timings at one unit interval and a timing one unit interval prior to the first binary discrimination timing; ternary discrimination of an amplitude level of the single-ended signal at a second ternary discrimination timing that is between the first binary discrimination timing and a timing one unit interval after the first binary discrimination timing; binary discrimination of an amplitude level of the single-ended signal at the first binary discrimination timing, by using the results of the ternary discriminations of the amplitude level of the single-ended signal at the first ternary discrimination timing and the second ternary discrimination timing; and output of a binary signal corresponding to the result of the binary discrimination.

The logic circuit may determine logical value 0 as a binary value for the amplitude level of the single-ended signal at the first binary discrimination timing when the result of the ternary discrimination of the amplitude level of the single-ended signal at the first ternary discrimination timing is an L1 level and when the result of the ternary discrimination of the amplitude level of the single-ended signal at the second ternary discrimination timing is the L1 level. The logic circuit may determine logical value 0 as a binary value for the amplitude level of the single-ended signal at the first binary discrimination timing when the result of the ternary discrimination of the amplitude level of the single-ended signal at the first ternary discrimination timing is the L1 level and when the result of the ternary discrimination of the amplitude level of the single-ended signal at the second ternary discrimination timing is an M level. The logic circuit may determine logical value 0 as a binary value for the amplitude level of the single-ended signal at the first binary discrimination timing when the result of the ternary discrimination of the amplitude level of the single-ended signal at the first ternary discrimination timing is the M level and when the result of the ternary discrimination of the amplitude level of the single-ended signal at the second ternary discrimination timing is the L1 level. The logic circuit may determine logical value 1 as a binary value for the amplitude level of the single-ended signal at the first binary discrimination timing when the result of the ternary discrimination of the amplitude level of the single-ended signal at the first ternary discrimination timing is the M level and when the result of the ternary discrimination of the amplitude level of the single-ended signal at the second ternary discrimination timing is an H1 level. The logic circuit may determine logical value 1 as a binary value for the amplitude level of the single-ended signal at the first binary discrimination timing when the result of the ternary discrimination of the amplitude level of the single-ended signal at the first ternary discrimination timing is the H1 level and when the result of the ternary discrimination of the amplitude level of the single-ended signal at the second ternary discrimination timing is the M level. The logic circuit may determine logical value 1 as a binary value for the amplitude level of the single-ended signal at the first binary discrimination timing when the result of the ternary discrimination of the amplitude level of the single-ended signal at the first ternary discrimination timing is the H1 level and when the result of the ternary discrimination of the amplitude level of the single-ended signal at the second ternary discrimination timing is the H1 level. Note that a reference level is a voltage level between a voltage level corresponding to logical value 0 and a voltage level corresponding to logical value 1; a first threshold level is a voltage level between the reference level and the voltage level corresponding to logical value 1; a second threshold level is a voltage level between the reference level and the voltage level corresponding to logical value 0; the H1 level is a range between the voltage level corresponding to logical value 1 and the first threshold level; the M level is a range between the first threshold level and the second threshold level; and the L1 level is a range between the second threshold level and the voltage level corresponding to logical value 0.

The logic circuit may ternary discriminate the amplitude level of the single-ended signal at a third ternary discrimination timing between a second binary discrimination timing one unit interval prior to the first binary discrimination timing and a timing one unit interval prior to the second binary discrimination timing. The logic circuit may binary discriminate the amplitude level of the single-ended signal at the first binary discrimination timing, by using the results of the ternary discriminations of the amplitude level of the single-ended signal at the first, second, and third ternary discrimination timings.

The logic circuit may ternary discriminate the amplitude level of the single-ended signal at a third ternary discrimination timing between a second binary discrimination timing one unit interval prior to first binary discrimination timing and a timing one unit interval prior to the second binary discrimination timing. The logic circuit may determine logical value 1 as a binary value for the amplitude level of the single-ended signal at the first binary discrimination timing when the result of the ternary discrimination of the amplitude level of the single-ended signal at the third ternary discrimination timing is the L1 level, when the result of the ternary discrimination of the amplitude level of the single-ended signal at the first ternary discrimination timing is the M level, and when the result of the ternary discrimination of the amplitude level of the single-ended signal at the second ternary discrimination timing is the M level. The logic circuit may determine logical value 0 as a binary value for the amplitude level of the single-ended signal at the first binary discrimination timing when the result of the ternary discrimination of the amplitude level of the single-ended signal at the third ternary discrimination timing is the H1 level, when the result of the ternary discrimination of the amplitude level of the single-ended signal at the first ternary discrimination timing is the M level, and when the result of the ternary discrimination of the amplitude level of the single-ended signal at the second ternary discrimination timing is the M level.

The receiving apparatus may further include a first comparator and a second comparator. The first comparator may receive the single-ended signal, compare an amplitude level of the received single-ended signal with the first threshold level, and output a result of the comparison as a first comparison result signal. The second comparator may receive the single-ended signal, compares the amplitude level of the received single-ended signal with the second threshold level, and output a result of the comparison as a second comparison result signal. The logic circuit may ternary discriminate the amplitude level of the single-ended signal, by using the first comparison result signal and the second comparison result signal.

The logic circuit may determine: the H1 level as a ternary value for the amplitude level of the single-ended signal when the first comparison result signal indicates an H2 level and the second comparison result signal indicates an H3 level; the M level as a ternary value for the amplitude level of the single-ended signal when the first comparison result signal indicates an L2 level and the second comparison result signal indicates the H3 level; and the L1 level as a ternary value for the amplitude level of the single-ended signal when the first comparison result signal indicates the L2 level and the second comparison result signal indicates an L3 level. Note that the H2 level is a range between the voltage level corresponding to logical value 1 and the first threshold level; the L2 level is a range between the first threshold level and the voltage level corresponding to logical value 0; the H3 level is a range between the voltage level corresponding to logical value 1 and the second threshold level; and the L3 level is a range between the second threshold level and the voltage level corresponding to logical value 0.

The receiving apparatus may further include a shift register circuit that latches and holds each of the first comparison result signal and the second comparison result signal. The logic circuit may ternary discriminate the amplitude level of the single-ended signal, by using the latched first comparison result signal and the latched second comparison result signal.

The shift register circuit may include: a first register that latches and holds the first comparison result signal corresponding to the amplitude level of the single-ended signal at the first ternary discrimination timing; a second resister that latches and holds the second comparison result signal corresponding to the amplitude level of the single-ended signal at the first ternary discrimination timing; a third register that latches and holds the first comparison result signal corresponding to the amplitude level of the single-ended signal at the second ternary discrimination timing; a fourth register that latches and holds the second comparison result signal corresponding to the amplitude level of the single-ended signal at the second ternary discrimination timing; a fifth register that latches and holds the first comparison result signal corresponding to the amplitude level of the single-ended signal at the third ternary discrimination timing; and a sixth register that latches and holds the second comparison result signal corresponding to the amplitude level of the single-ended signal at the third ternary discrimination timing. The logic circuit ternary may discriminate the amplitude level of the single-ended signal, by using the latched first comparison result signal and the latched second comparison result signal.

The receiving apparatus may further include a third comparator that receives the single-ended signal, compares an amplitude level of the received single-ended signal with a reference level, and outputs a result of the comparison as a third comparison result signal. The logic circuit may binary discriminate the single-ended signal at the first binary discrimination timing, by using the third comparison result signal.

When the receiving apparatus receives differential signals obtained by differentially converting a training signal including a signal in which a voltage level corresponding to logical value 1 and a voltage level corresponding to logical value 0 are alternately repeated every one unit interval, the logic circuit may perform, on the single-ended signal obtained by single-ended converting the training signal, binary discrimination by using the results of the ternary discriminations and binary discrimination by using the third comparison result signal, and select a setting for outputting the binary signal having a lower bit error rate, based on bit error rates of these binary discriminations.

The training signal may include a signal of a voltage level corresponding to logical value 0 that lasts for a period longer than one unit interval or a voltage level corresponding to logical value 1 that lasts for a period longer than one unit interval.

The receiving apparatus may further include a third comparator that receives the single-ended signal, compares an amplitude level of the received single-ended signal with a reference level, and outputs a result of the comparison as a third comparison result signal. The logic circuit may output, by using at least the result of the ternary discrimination of the amplitude level of the single-ended signal at the first binary discrimination timing, one of the binary signal based on the third comparison result signal and the binary signal based on the results of the ternary discriminations of the amplitude level of the single-ended signal at the first ternary discrimination timing and the second ternary discrimination timing.

The receiving apparatus may further comprise a delay circuit unit in a prior stage of the differential amplifier. The delay circuit unit may adjust timings at which the differential signals are input to the differential amplifier, and the logic circuit may control the delay circuit unit to adjust a differential signal skew of the differential signals.

The logic circuit may binary discriminate and determine, when the results of the ternary discriminations of the amplitude level of the single-ended signal at the first, second, and third ternary discrimination timings are all the M level, that the amplitude level of the single-ended signal at the first binary discrimination timing has the same logical value as the amplitude level of the single-ended signal at the second binary discrimination timing.

Hereinafter, exemplary embodiments will be described in detail with appropriate reference to the drawings. However, in some cases, the description will not be made in too much detail. For example, detailed descriptions about well-known matters or redundant description about substantially the same configuration will not be made, in some cases. This is to avoid the following descriptions from being unnecessarily redundant and to help a person skilled in the art to easily understand the description.

Note that the inventor provides the accompanying drawings and the following description just to help a person skilled in the art to sufficiently understand, but does not intend to use those drawings or description to limit the subject matters defined by the claims.

Specific Issues Considered in the Present Disclosure

For example, a plurality of high speed interfaces such as USB (Universal Serial Bus) and HDMI (Registered Trade Mark) (High-Definition Multimedia Interface) use a method called "differential transmission". In the method, a signal is transmitted not on a single line, but signals that are 180 degrees different from each other are transmitted on a pair of lines. However, with this transmission method, the phases of the two signals are deviated, and unbalanced components called "skew" are thus created. Here, the "skew" is a time difference between a positive signal (D+) and a negative signal (D−) of the differential signals. If the skew is large, the differential signals are deteriorated, whereby a bit error rate in binary discrimination is increased.

Figure 12:
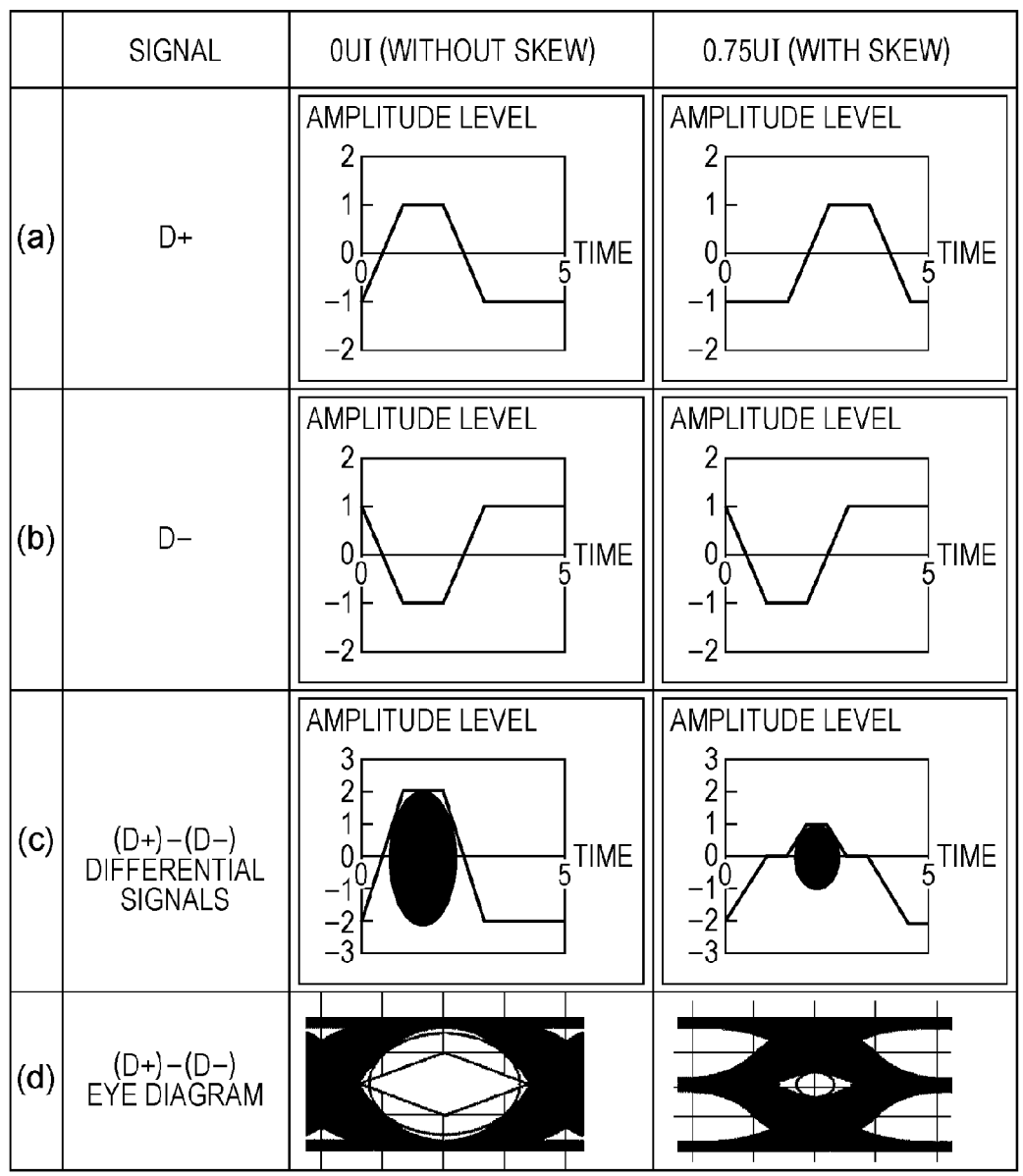
FIG. 12 is an eye diagram illustrating the influence of a skew caused by the difference between the lengths of two signal lines.

The above-described skew is created by different causes. The most common cause is the difference between the effective lengths of two signal lines in a transmission line connecting the transmission side and the reception side. FIG. 12 is an eye diagram illustrating the influence of skew caused by the difference between the lengths of two signal lines. Column (a) of FIG. 12 shows a time-base waveform illustrating changes in an amplitude level of the positive signal (D+) of the differential signals with respect to time; column (b) of FIG. 12 shows a time-base waveform illustrating changes in an amplitude level of the negative signal (D−) of the differential signals with respect to time; column (c) of FIG. 12 shows a time-base waveform illustrating changes in an amplitude level of the differential signals (=positive signal (D+)− negative signal (D−)) with respect to time; and column (d) of FIG. 12 shows eye diagrams of the differential signals. Here, FIG. 12 shows the case that there is no skew (the skew is 0 unit interval (UI)) and the case that there is a skew (the skew is 0.75 unit interval (UI)). With reference to column (d) of FIG. 12, when there is no skew, the eye is fully open. Because the "eye width" and the "eye height" are large, the quality of the differential transmission can be determined high. On the other hand, it can be understood that, as the skew is larger, the eye is smaller. That is, it can be understood that, because the "eye width" and the "eye height" are smaller, the quality of the differential transmission is lower, and the range in which discrimination can be performed without error is smaller.

A skew adjustment technique of U.S. Pat. No. 4,064,630 has a problem that it is possible to adjust only the skew between data signals and a clock signal, but it is impossible to adjust the skew between the differential data signals. In addition, in an over-sampling technique of Unexamined Japanese Patent Publication No. 2011-193039, if the skew between differential data signals is large, the signal quality is deteriorated in both a time direction and an amplitude direction; therefore, the technique is not effective in improving the error rate. The over-sampling technique of Unexamined Japanese Patent Publication No. 2011-193039 has another problem that, in order to perform over-sampling, it is necessary to mount a high-spec receiving device that can operate at a high frequency.

The present exemplary embodiments are focused on the above-described problems and provide receiving apparatus 1 in which, without adding a device operable at a frequency higher than an operating frequency for common binary transmission, even when differential signals of low quality in differential transmission, in other words, differential signals having a large skew are received, it is possible to binary discriminate the differential signals having a large skew. Hereinafter, a first exemplary embodiment will be described with reference to FIG. 1 to FIG. 6.

First Exemplary Embodiment

In a conventional receiving apparatus, an amplitude level of differential signals is binary discriminated, at a binary discrimination timing B (see FIG. 2), with a voltage level between a voltage level V0 corresponding to logical value 0 and a voltage level V1 corresponding to logical value 1 as a reference level Vth, and a binary signal is output as a result corresponding to the binary discrimination. On the other hand, in receiving apparatus 1 according to the first exemplary embodiment, the amplitude level of differential signals is ternary discriminated at ternary discrimination timings X and Y (see FIG. 2) before and after the binary discrimination timing B, and a ternary signal corresponding to the ternary discrimination is generated. After that, the amplitude level of the differential signals is ternary discriminated based on the ternary signal. When the ternary discrimination of the amplitude level of differential signals is performed, a first threshold level VHth and a second threshold level VLth are used. In receiving apparatus 1, differential signals are single-ended converted into a single-ended signal, and an amplitude level of the single-ended signal is ternary discriminated and binary discriminated; thus, the amplitude of the differential signals is ternary discriminated and binary discriminated.

1. Configuration

FIG. 1 is a block diagram showing structural elements of receiving apparatus 1 according to the first exemplary embodiment of the present disclosure. Receiving apparatus 1 of FIG. 1 is equipped with comparator 2 (that is a differential amplifier), first comparator 3, second comparator 4, shift register circuit 6, and logic circuit 7. Shift register circuit 6 includes first to sixth registers 61 to 66 and stores comparison result signals for ternary signal conversion. Receiving apparatus 1 receives differentially converted differential signals, binary discriminates the amplitude level of the received differential signals, and outputs a binary signal corresponding to the binary discrimination. In detail, receiving apparatus 1 single-ended converts the differential signals into the single-ended signal and then binary discriminates the single-ended signal at intervals of one unit interval. The interval of the one unit interval is defined by a clock signal CLK. As to be described later, this binary discrimination is performed based on the ternary discrimination.

Comparator 2 receives differential signals and single-ended converts the received differential signals into a single-ended signal (hereinafter, referred to as "data signal" in some cases). Next, comparator 2 outputs the single-ended signal to first comparator 3 and second comparator 4.

First comparator 3 receives the single-ended signal. First comparator 3 compares an amplitude level of the received single-ended signal with the first threshold level VHth between the reference level Vth and the voltage level V1 corresponding to logical value 1, and outputs the comparison result to shift register circuit 6 as a first comparison result signal. Here, first comparator 3 outputs the first comparison result signal indicating a high (H) level when the amplitude level of the single-ended signal is equal to or higher than the first threshold level VHth, or outputs the first comparison result signal indicating a low (L) level when the amplitude level of the single-ended signal is lower than the first threshold level VHth.

Second comparator 4 receives the single-ended signal. Second comparator 4 compares an amplitude level of the received single-ended signal with the second threshold level VLth between the reference level Vth and the voltage level V0 corresponding to logical value 0, and outputs the comparison result to the shift register circuit 6 as a second comparison result signal. Here, second comparator 4 outputs the second comparison result signal indicating the high (H) level when the amplitude level of the single-ended signal is equal to or higher than the second threshold level VLth, or outputs the second comparison result signal indicating the low (L) level when the amplitude level of the single-ended signal is lower than the second threshold level VLth.

Delay circuit 5 delays the clock signal CLK to generate a ternary discrimination time clock that provides ternary discrimination timings W, X, and Y, and feeds the generated ternary discrimination time clock to first to sixth registers 61 to 66. The clock signal CLK generates binary discrimination timings A and B.

By using the ternary discrimination time clock, shift register circuit 6 latches and holds the first comparison result signal output from first comparator 3 and the second comparison result signal output from second comparator 4, and bit-shifts the first comparison result signal and the second comparison result signal. Here, register 61 latches and holds the first comparison result signal at the ternary discrimination timing W. Register 62 latches and holds the first comparison result signal at the ternary discrimination timing X. Register 63 latches and holds the first comparison result signal at the ternary discrimination timing Y. Register 64 latches and holds the second comparison result signal at the ternary discrimination timing W. Register 65 latches and holds the second comparison result signal at the ternary discrimination timing X. Register 66 latches and holds the second comparison result signal at the third ternary discrimination timing Y.

Logic circuit 7 converts the single-ended signal at the ternary discrimination timings X, Y, and W into respective ternary signals indicating the three amplitude levels (high (H) level, middle (M) level, and low (L) level), based on the output of each of registers 61 to 66 in shift register circuit 6 at the ternary discrimination timings X, Y, and W. This conversion is performed according to a table of FIG. 3 to be described later.

Next, logic circuit 7 binary discriminates the single-ended signal at each binary discrimination timing as to be described below and outputs a binary signal corresponding to the binary discrimination. Specifically, logic circuit 7 performs binary discrimination, based on a first ternary signal converted from the single-ended signal at the ternary discrimination timing X between the binary discrimination timing B and a timing one unit interval prior to the binary discrimination timing B and also based on a second ternary signal converted from the single-ended signal at the ternary discrimination timing Y between the binary discrimination timing B and a timing one unit interval after the binary discrimination timing B. This binary discrimination is performed according to a table of FIG. 4 to be described later. Specifically, logic circuit 7 converts the single-ended signal, at the respective ternary discrimination timings, into the ternary signals indicating the three amplitude levels, and binary discriminates the single-ended signal at the respective binary discrimination timings, based on the first ternary signal converted at the ternary discrimination timing X between the binary discrimination timing B and a timing one unit interval prior to the binary discrimination timing B and also based on the second ternary signal converted at the ternary discrimination timing Y between the binary discrimination timing B and a timing one unit interval after the binary discrimination timing B. Note that, if the first ternary signal converted at the ternary discrimination timing X and the second ternary signal converted at the ternary discrimination timing Y are both the middle (M) level, binary discrimination can be performed according to a table of FIG. 5 to be described later.

If the single-ended signal cannot be binary discriminated according to the table of FIG. 4, logic circuit 7 binary discriminates the single-ended signal to determine logical value 0 or logical value 1 for the single-ended signal, according to the table of FIG. 5, based on a third ternary signal converted at the ternary discrimination timing W between the binary discrimination timing A one unit interval prior to the binary discrimination timing B and a timing one unit interval prior to the binary discrimination timing A, and logic circuit 7 outputs the binary signal corresponding to the binary discrimination. Note that, the table of FIG. 4 is applied to binary discrimination for the binary discrimination timing A at a timing one unit interval prior to a timing to perform binary discrimination for the binary discrimination timing B. Thus, when the results of the ternary discriminations at the ternary discrimination timings W and X are the levels L and M, the table of FIG. 4 is applied to the binary discrimination timing A, and a result of the binary discrimination at the binary discrimination timing A is determined to be logical value 0. On the other hand, when the results of the ternary discriminations at the ternary discrimination timings W and X are the levels H and M, the table of FIG. 4 is applied to the binary discrimination timing A, and the result of the binary discrimination at the binary discrimination timing A is determined to be logical value 1.

2. Operation

The operation of receiving apparatus 1 according to the first exemplary embodiment configured as described above will be described below.

Figure 2:
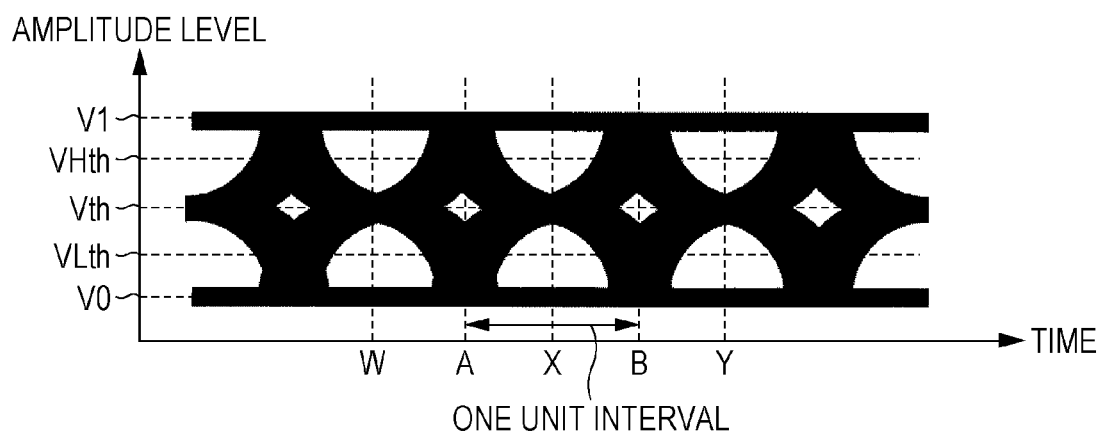
FIG. 2 is a time-base waveform diagram showing changes in an amplitude level of a single-ended signal with respect to time.

FIG. 2 is a time-base waveform diagram showing changes in the amplitude level of the single-ended signal with respect to time. Receiving apparatus 1 outputs the binary signal indicating logical value 1 when receiving apparatus 1 determines that the amplitude level of the single-ended signal at the binary discrimination timing B is between the voltage level V1 corresponding to logical value 1 and the reference level Vth. Receiving apparatus 1 outputs the binary signal indicating logical value 0 when receiving apparatus 1 determines that the amplitude level of the single-ended signal at the binary discrimination timing B is between the voltage level V0 corresponding to logical value 0 and the reference level Vth. Receiving apparatus 1 according to the present exemplary embodiment determines one of the three amplitude levels for the amplitude level of the single-ended signal before and after the binary discrimination timing, and discriminates the amplitude level of the data signal at the binary discrimination timing. A detailed description will be made below.

With reference to FIG. 2, receiving apparatus 1 converts the single-ended signal into the ternary signal indicating the three amplitude levels by using the first threshold level VHth and the second threshold level VLth that are different from the reference level Vth. Here, the range between the voltage level V1 corresponding to logical value 1 and the first threshold level VHth is defined to be a high (H) level; the range between the first threshold level VHth and the second threshold level VLth is defined to be a middle (M) level; and the range between the second threshold level VLth and the voltage level V0 corresponding to logical value 0 is defined to be a low (L) level. Next, based on the converted ternary signal, receiving apparatus 1 determines whether the amplitude level of the single-ended signal at each binary discrimination timing is in the range between the voltage level V1 corresponding to logical value 1 and the reference level Vth or in the range between the voltage level V0 corresponding to logical value 0 and the reference level Vth. Specifically, receiving apparatus 1 discriminates the single-ended signal at the binary discrimination timing B, based on the first ternary signal converted at the ternary discrimination timing X between the binary discrimination timing B and a timing one unit interval prior to the binary discrimination timing B, and also based on the second ternary signal converted at the ternary discrimination timing Y between the binary discrimination timing B and a timing one unit interval after the binary discrimination timing B.

FIG. 3 illustrates the relationship between the first comparison result signal and the second comparison result signal both input to logic circuit 7 of FIG. 1 and the ternary signal converted based on the first comparison result signal and the second comparison result signal. When the first comparison result signal indicating the high level is output from first comparator 3 and the second comparison result signal indicating the high level is output from second comparator 4, the single-ended signal is converted into a ternary signal indicating the high (H) level. When the first comparison result signal indicating the low level is output from first comparator 3 and the second comparison result signal indicating the high level is output from second comparator 4, the single-ended signal is converted into the ternary signal corresponding to the middle (M) level. When the first comparison result signal indicating the low level is output from first comparator 3 and the second comparison result signal indicating the low level is output from second comparator 4, the single-ended signal is converted into the ternary signal corresponding to the low (L) level.

FIG. 4 illustrates the ternary signals at the ternary discrimination timings X and Y and the binary signal determined based on these ternary signals. When the amplitude level of the single-ended signal at the ternary discrimination timing X is the low (L) level and the amplitude level of the single-ended signal at the ternary discrimination timing Y is the low (L) level, it can be determined that the amplitude level of the single-ended signal does not change in the period between the ternary discrimination timing X and the ternary discrimination timing Y. Thus, the binary logic level of the single-ended signal at the binary discrimination timing B can be determined to be logical value 0.

When the amplitude level of the single-ended signal at the ternary discrimination timing X is the low (L) level and the amplitude level of the single-ended signal at the ternary discrimination timing Y is the middle (M) level, the single-ended signal is changing, at the binary discrimination timing B, from the voltage level V0 corresponding to logical value 0 to the voltage level V1 corresponding to logical value 1; thus, the binary logic level of the single-ended signal at the binary discrimination timing B can be determined to be the voltage level V0 corresponding to logical value 0.

When the amplitude level of the single-ended signal at the ternary discrimination timing X is the middle (M) level and the amplitude level of the single-ended signal at the ternary discrimination timing Y is the low (L) level, the single-ended signal is changing, at the binary discrimination timing B, from the voltage level V1 corresponding to logical value 1 to the voltage level V0 corresponding to logical value 0; thus, the binary logic level of the single-ended signal at the binary discrimination timing B can be determined to be the voltage level V0 corresponding to logical value 0.

When the amplitude level of the single-ended signal at the ternary discrimination timing X is the middle (M) level and the amplitude level of the single-ended signal at the ternary discrimination timing Y is the high (H) level, the single-ended signal is changing, at the binary discrimination timing B, from the voltage level V0 corresponding to logical value 0 to the voltage level V1 corresponding to logical value 1; thus, the binary logic level of the single-ended signal at the binary discrimination timing B can be determined to be the voltage level V1 corresponding to logical value 1.

When the amplitude level of the single-ended signal at the ternary discrimination timing X is the high (H) level and the amplitude level of the single-ended signal at the ternary discrimination timing Y is the middle (M) level, the single-ended signal is changing, at the binary discrimination timing B, from the voltage level V1 corresponding to logical value 1 to the voltage level V0 corresponding to logical value 0; thus, the binary logic level of the single-ended signal at the binary discrimination timing B can be determined to be the voltage level V1 corresponding to logical value 1.

When the amplitude level of the single-ended signal at the ternary discrimination timing X is the high (H) level and the amplitude level of the single-ended signal at the ternary discrimination timing Y is the high (H) level, it can be determined that the amplitude level of the single-ended signal does not change in the period between the ternary discrimination timing X and the ternary discrimination timing Y. Thus, the binary logic level of the single-ended signal at the binary discrimination timing B can be determined to be logical value 1.

In the present exemplary embodiment, it is a precondition that the differential signal skew of the differential signals is large; therefore, the amplitude level does not rise rapidly. Thus, there is no case that the amplitude level of the single-ended signal at the ternary discrimination timing X is the low (L) level and the amplitude level of the single-ended signal at the ternary discrimination timing Y is the high (H) level. In addition, there is no case that the amplitude level of the single-ended signal at the ternary discrimination timing X is the high (H) level and the amplitude level of the single-ended signal at the ternary discrimination timing Y is the low (L) level.

When the amplitude level at the ternary discrimination timing X is the middle (M) level and the amplitude level at the ternary discrimination timing Y is the middle (M) level, FIG. 5 is referenced, and the result at the ternary discrimination timing W, which is one timing prior, is used; thus, it is possible to binary discriminate the single-ended signal. Specifically, when the amplitude levels of the single-ended signal at the ternary discrimination timings W, X, and Y are the low (L) level, the middle (M) level, and the middle (M) level respectively as shown in FIG. 5, it can be determined that the amplitude level of the single-ended signal is logical value 0 at the binary discrimination timing A and that the amplitude level of the single-ended signal is thus logical value 1 at the binary discrimination timing B. On the other hand, when the amplitude levels of the single-ended signal at the ternary discrimination timings W, X, and Y are the high (H) level, the middle (M) level, and the middle (M) level respectively, it can be determined that the amplitude level of the single-ended signal is logical value 1 at the binary discrimination timing A and that the amplitude level of the single-ended signal is thus logical value 0 at the binary discrimination timing B. The table shown in FIG. 4 and the table shown in FIG. 5 may be implemented on logic circuit 7 as separate tables, and it may be possible to implement on logic circuit 7 such a table as shown in FIG. 6 (i.e. a table in which the table shown in FIG. 4 and the table shown in FIG. 5 are combined in one body).

When the results of the ternary discriminations at the ternary discrimination timings W, X, and Y are all the M levels, the result of the binary discrimination at the binary discrimination timing A may be used as the result of the binary discrimination at the binary discrimination timing B. That is, when the results of the ternary discriminations are the M levels more than two times continuously, binary discrimination can be performed by using the result of the binary discrimination at a past timing obtained by using a result of a ternary discrimination which is the level L or the level H. Specifically, when the results of the ternary discriminations at the ternary discrimination timings W, X, and Y are all the levels M, a reference is given to a past timing, at which the binary discrimination was able to be performed according to FIG. 4; thus, the amplitude is binary discriminated and determined to be the same logical value as the logical value of the result of the binary discrimination at that past timing.

3. Advantageous Effect

As described above, receiving apparatus 1 of the present exemplary embodiment receives differentially converted differential signals, determines, at the binary discrimination timing B, a binary signal for the differential signals by using the voltage level between the voltage level corresponding to logical value 0 and the voltage level corresponding to logical value 1 as the reference level Vth, and outputs the binary signal. Receiving apparatus 1 is equipped with: comparator 2 that receives the differential signals and single-ended converts the received differential signals into the data signal; and logic circuit 7 that converts the single-ended converted data signal into the respective ternary signals H, M, and L indicating three amplitude levels and determines a binary signal for the data signal, based on the first ternary signal converted at the ternary discrimination timing X between the binary discrimination timing B and a timing one unit interval prior to the first binary discrimination timing B and also based on the second ternary signal converted at the ternary discrimination timing Y between the binary discrimination timing B and a timing one unit interval after the binary discrimination timing B.

With this configuration, it is possible to highly accurately determine a binary value for differential signals having a large skew without adding a high-spec device that operates at a speed higher than an operating frequency of a common binary transmission.

Further, logic circuit 7 determines a binary signal indicating logical value 0 or logical value 1 for the data signal, based on the third ternary signal converted at the third ternary discrimination timing W between the binary discrimination timing A, which is one unit interval prior to the binary discrimination timing B, and a timing one unit interval prior to the binary discrimination timing A, and logic circuit 7 outputs the binary signal.

With this configuration, even when it is difficult to determine the binary signal 0 or 1, based on each of the first ternary signal and the second ternary signal, it is possible to determine the binary signal for the data signal, further based on the third signal; thus, it is possible to more accurately determine a binary signal for differential signals having a large skew.

Receiving apparatus 1 is further equipped with first comparator 3 that receives the data signal, compares the amplitude level of the received data signal with the first threshold level VHth between the reference level Vth and the voltage level corresponding to logical value 1, and outputs the comparison result as the first comparison result signal; and second comparator 4 that receives the data signal, compares the amplitude level of the received data signal with the second threshold level VLth between the reference level Vth and the voltage level corresponding to logical value 0, and outputs the comparison result as the second comparison result signal. Logic circuit 7 converts the data signal into the respective ternary signals, based on the first comparison result signal and the second comparison result signal.

With this configuration, it is possible to highly accurately determine a binary value for differential signals having a large skew without adding a high-spec device that operates at a speed higher than an operating frequency of a common binary transmission.

In addition, receiving apparatus 1 is further equipped with shift register circuit 6 that latches and holds the first comparison result signal and the above second comparison result signal. Shift register circuit 6 is equipped with register 61 that latches and holds the first comparison result signal at the ternary discrimination timing W, register 62 that latches and holds the first comparison result signal at the ternary discrimination timing X, register 63 that latches and holds the first comparison result signal at the ternary discrimination timing Y, register 64 that latches and holds the second comparison result signal at the ternary discrimination timing W, register 65 that latches and holds the second comparison result signal at the ternary discrimination timing X, and register 66 that latches and holds the second comparison result signal at the ternary discrimination timing Y.

With this configuration, it is possible to highly accurately determine a binary value for differential signals having a large skew without adding a high-spec device that operates at a speed higher than an operating frequency of a common binary transmission.

Second Exemplary Embodiment

In receiving apparatus 1 according to the above-described first exemplary embodiment, ternary discrimination is performed to determine a binary value indicating logical value 0 or logical value 1 for differential signals having a large skew. However, receiving apparatus 1A according to a second exemplary embodiment is configured to select ternary discrimination and conventional binary discrimination. With this configuration, ternary discrimination can be performed when differential signals having a large skew are input; and binary discrimination can be performed when differential signals having almost no skew are input.

1. Configuration

Figure 7:
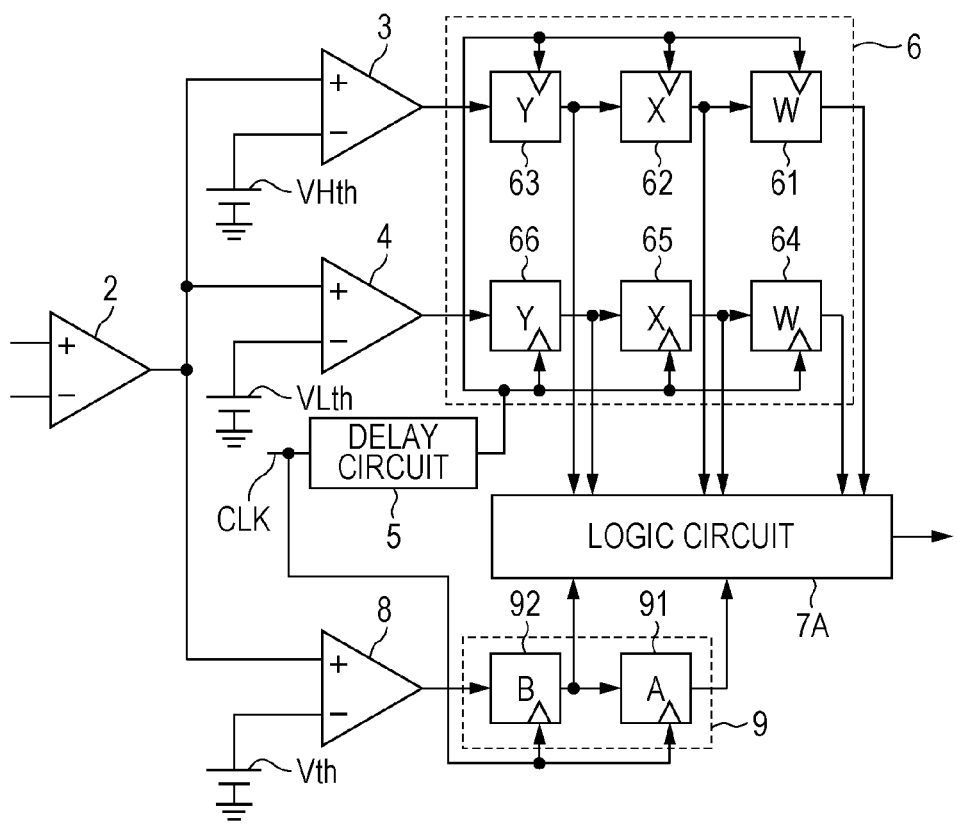
FIG. 7 is a block diagram showing structural elements of receiving apparatus 1A according to a second exemplary embodiment of the present disclosure.

FIG. 7 is a block diagram showing structural elements of receiving apparatus 1A according to the second exemplary embodiment of the present disclosure. Compared to receiving apparatus 1 of FIG. 1, receiving apparatus 1A of FIG. 7 is equipped with logic circuit 7A instead of logic circuit 7 and is further equipped with third comparator 8 having the reference level Vth, and shift register circuit 9 including registers 91 and 92.

With reference to FIG. 7, third comparator 8 receives the single-ended signal, compares the amplitude level of the received single-ended signal with the reference level Vth, and outputs the comparison result to shift register circuit 9 as third comparison result signal. Here, third comparator 8 outputs the third comparison result signal indicating the high (H) level when the amplitude level of the single-ended signal is equal to or higher than the reference level Vth, or outputs the third comparison result signal indicating the low (L) level when the amplitude level of the single-ended signal is lower than the reference level Vth.

Shift register circuit 9 latches and bit-shifts the third comparison result signal output from third comparator 8 by using the clock signal CLK. Here, first register 91 latches and holds the third comparison result signal at the binary discrimination timing A. Second resister 92 latches and holds the third comparison result signal at the binary discrimination timing B.

Compared to logic circuit 7 of FIG. 1, logic circuit 7A is different in that logic circuit 7A determines a binary value of logical value 0 or logical value 1 for the single-ended signal and that the binary discrimination is performed based on the third comparison result signal at the binary discrimination timings A and B, and the binary signals corresponding to the binary discrimination is output. Here, logic circuit 7A selects the binary signal having the lower bit error rate from two binary signals, which are the binary signal based on the above results of the ternary discriminations and the binary signal based on the above third comparison result signal. Then logic circuit 7A outputs the selected binary signal.

2. Operation

The operation of receiving apparatus 1A according to the second exemplary embodiment configured as described above will be described below. Note that only the difference from the first exemplary embodiment will be described below.

Logic circuit 7A selects between binary discrimination and ternary discrimination, based on a predetermined condition. For example, logic circuit 7A selects between the binary discrimination and the ternary discrimination, based on a bit error rate. A description will be made below about a method to select between the binary discrimination and the ternary discrimination by measuring a bit error rate by using a training signal TS.

Figure 8:
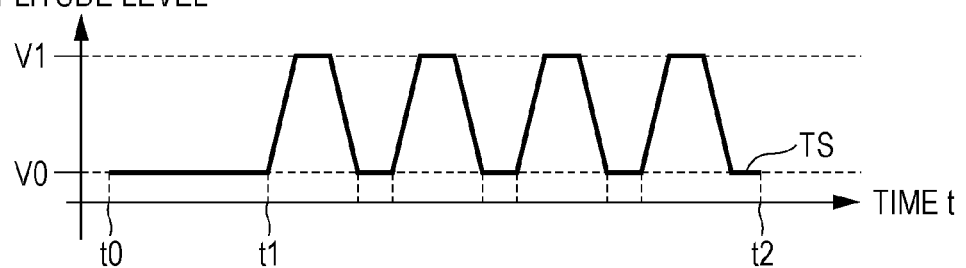
FIG. 8 is a time-base waveform diagram showing changes in an amplitude level, with respect to time t, of a training signal TS to be used to select a binary signal that is output from logic circuit 7A of FIG. 7.

FIG. 8 is a time-base waveform diagram illustrating changes in the amplitude level of the training signal TS with respect to time t, where the training signal TS is used to select, as the binary signal to be output from logic circuit 7A of FIG. 7, between the binary signal by the binary discrimination and the binary signal by the ternary discrimination. Receiving apparatus 1A receives differential signals obtained by differentially converting the training signal TS including a signal (from time t1 to time t2) in which the voltage level corresponding to logical value 1 and the voltage level corresponding to logical value 0 are alternately repeated every one unit interval. In other words, the voltage level changes (from logical value 0 to logical value 1 or logical value 1 to logical value 0) every one unit interval. At this time, logic circuit 7A measures a bit error rate of the data signal included in the training signal TS. This measurement is conducted for each of the case that the above binary discrimination based on the results of the ternary discriminations is performed and the case that the above binary discrimination based on the third comparison result signal is performed. Logic circuit 7A compares these bit error rates to select the setting for outputting the binary signal corresponding to the binary discrimination having the lower bit error rate. Specifically, logic circuit 7A selects between outputting the binary signal corresponding to the binary discrimination based on the ternary signals at the ternary discrimination timings W, X, and Y and the binary signal latched by shift register circuit 9 at the binary discrimination timing B.

Further, the training signal TS includes a signal of the voltage level V0 corresponding to logical value 0 that lasts for a period (time t0 to time t1 of FIG. 8) longer than one unit interval. Thus, logic circuit 7A detects that the training signal TS is received, by receiving the signal of the voltage level V0 corresponding to logical value 0 that lasts for a period longer than one unit interval, and logic circuit 7A starts to measure the bit error rate. With such a configuration, as shown in FIG. 4, it is possible to output the binary signal determined by third comparator 8 according to the present exemplary embodiment even in the case that it is difficult to determine the binary signal from the ternary signals at the two ternary discrimination timings X and Y, for example, the case that the amplitude level at the ternary discrimination timing X is the low (L) level and the amplitude level at the time Y is the high (H) level or the case that the amplitude level at the ternary discrimination timing X is the high (H) level and the amplitude level at the time Y is the low (L) level. Thus, it is possible to perform binary discrimination and to determine a binary value indicating logical value 1 or logical value 0 even for the differential signals having almost no skew.

It is described that the above-described training signal TS includes a signal of the voltage level V0 corresponding to logical value 0 that lasts for a period longer (time t0 to time t1 of FIG. 8) than one unit interval; however, the training signal TS may include a signal of the voltage level V1 corresponding to logical value 1 that lasts for a period (time t0 to time t1 of FIG. 8) longer than one unit interval. In this case, the measurement of the bit error rate is stated upon detecting the reception of the training signal TS by receiving the signal of the voltage level V1 corresponding to logical value 1 that lasts for a period longer than one unit interval.

3. Advantageous Effect

As described above, compared to the above-described receiving apparatus 1 according to the first exemplary embodiment, receiving apparatus 1A of the present exemplary embodiment is further equipped with third comparator 8 that receives the data signal, compares the amplitude level of the received data signal with the reference level Vth, and outputs the result of the comparison as the third comparison result signal. Logic circuit 7A determines the respective binary signal of logical value 0 or logical value 1 for the data signal, based on the third comparison result signal.

With this configuration, receiving apparatus 1A can select between the binary signal by the binary discrimination and the binary signal by the ternary discrimination. Thus, compared to above-described receiving apparatus 1 according to the first exemplary embodiment, receiving apparatus 1A can determine the binary signal even for the differential signals having a smaller skew.

Further, in receiving apparatus 1A, when receiving apparatus 1A receives the differential signals obtained by differentially converting the training signal TS in which the voltage level corresponding to logical value 1 and the voltage level corresponding to logical value 0 are alternately repeated every one unit interval, logic circuit 7A selects and outputs the binary signal having the lower bit error rate, based on the bit error rates of the data signal based on the training signal TS.

With this configuration, compared to the above-described receiving apparatus 1 according to the first exemplary embodiment, receiving apparatus 1A can receive more appropriate binary signals, based on the bit error rate at the time of receiving the training signal TS; thus, it is possible to highly accurately determine the binary signal for the differential signals regardless of whether the differential signals have a large skew or a small skew.

The training signal TS includes the signal of the voltage level corresponding to logical value 0 or the voltage level corresponding to logical value 1 that lasts for a period longer than one unit interval.

With this configuration, receiving apparatus 1A can detect when the training signal TS is received, and can thus detect the time to measure the bit error rate.

In the present exemplary embodiment, the training signal TS is used to measure a bit error rate; however, the present disclosure is not limited to this manner. For example, logic circuit 7A may measure the bit error rate of an input signal to determine which is more appropriate, binary discrimination or ternary discrimination, and may select between the binary discrimination and the ternary discrimination, based on the determination.

Third Exemplary Embodiment

In the above-described receiving apparatus 1A according to the second exemplary embodiment, selection is made, by receiving the training signal TS, between outputting the binary signal determined from the ternary signals at the ternary discrimination timings W, X, and Y and outputting the binary signal latched by shift register circuit 9; however, the present disclosure is not limited to this manner. For example, as in the present exemplary embodiment, conversion into ternary signals may be also performed at the binary discrimination timings A and B; and based on the converted ternary signals, selection may be made between outputting the binary signal determined based on the ternary signals at the ternary discrimination timings W, X, and Y and outputting the binary signal latched by shift register circuit 9.

1. Configuration

Figure 9:
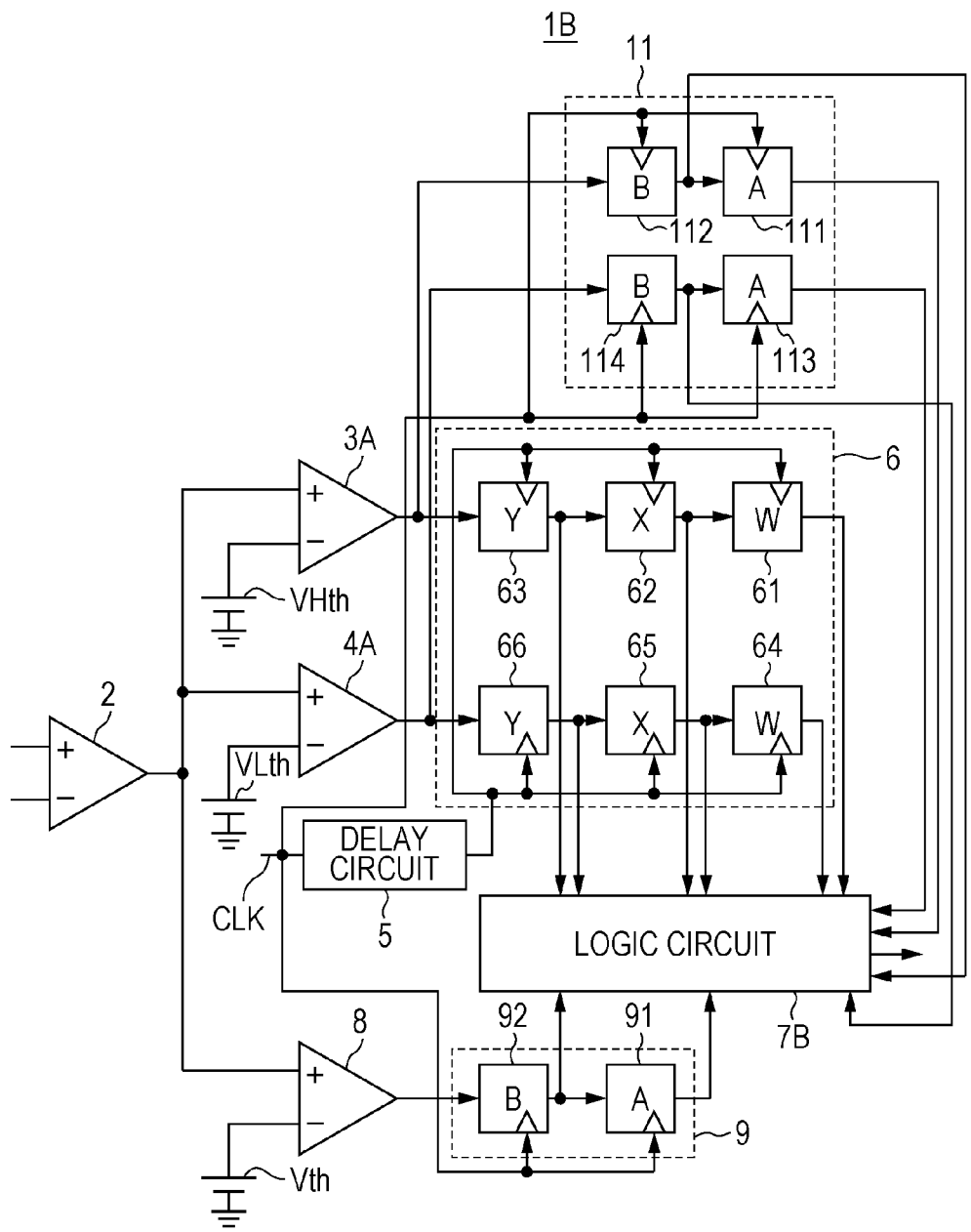
FIG. 9 is a block diagram showing structural elements of receiving apparatus 1B according to a third exemplary embodiment of the present disclosure.

FIG. 9 is a block diagram showing structural elements of receiving apparatus 1B according to a third exemplary embodiment of the present disclosure. Compared to receiving apparatus 1A of FIG. 7, receiving apparatus 1B of FIG. 9 is equipped with logic circuit 7B instead of logic circuit 7A, first comparator 3A instead of first comparator 3, and first comparator 4A instead of second comparator 4, and is further equipped with shift register circuit 11 including registers 111 to 114.

First comparator 3A receives a single-ended signal, compares the amplitude level of the received single-ended signal with a first threshold level VHth between a reference level Vth and a voltage level corresponding to logical value 1, and outputs the result of the comparison to shift register circuit 6 and shift register circuit 11 as a first comparison result signal. Here, first comparator 3A outputs the first comparison result signal indicating a high (H) level when the amplitude level of the single-ended signal is equal to or higher than the first threshold level VHth, or outputs the first comparison result signal indicating a low (L) level when the amplitude level of the single-ended signal is lower than first threshold level VHth.

Second comparator 4A receives the single-ended signal, compares the amplitude level of the received single-ended signal with a second threshold level VLth between the reference level Vth and a voltage level corresponding to logical value 0, and outputs the result of the comparison to shift register circuit 6 and shift register circuit 11 as a second comparison result signal. Here, second comparator 4A outputs the second comparison result signal indicating the high (H) level when the amplitude level of the single-ended signal is equal to or higher than the second threshold level VLth, or outputs the second comparison result signal indicating the low (L) level when the amplitude level of the single-ended signal is lower than the second threshold level VLth.

By using a clock signal CLK, shift register circuit 11 latches and holds the first comparison result signal output from first comparator 3A and the second comparison result signal output from second comparator 4A, and bit-shifts the first comparison result signal and the second comparison result signal. Here, register 111 latches and holds the first comparison result signal at the binary discrimination timing A. Register 112 latches and holds the first comparison result signal at the binary discrimination timing B. Register 113 latches and holds the second comparison result signal at the binary discrimination timing A. Register 114 latches and holds the second comparison result signal at the binary discrimination timing B.

Logic circuit 7B is different from logic circuit 7 of FIG. 1 in the following points. Specifically, logic circuit 7B converts the single-ended signal at the ternary discrimination timings W, X, and Y into the ternary signals H, M, or L each indicating each of the three amplitude levels according to the above-described table of FIG. 3, based on the first comparison result signal and the second comparison result signal latched and held by shift register circuit 11. Then, logic circuit 7B performs binary discrimination based on the converted ternary signals H, M, and L, and selects between outputting the binary signal corresponding to the binary discrimination and outputting the binary signal latched by shift register circuit 9.

2. Operation

The operation of receiving apparatus 1B according to the third exemplary embodiment configured as described above will be described below. Note that, only the difference from the second exemplary embodiment will be described below.

Figure 10:
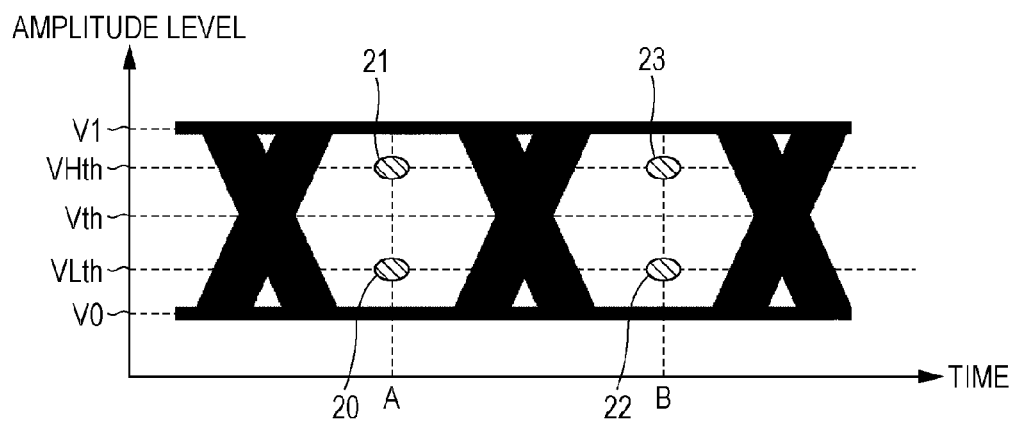
FIG. 10 is a time-base waveform diagram showing changes in an amplitude level, with respect to time, of a data signal received by receiving apparatus 1B of FIG. 9.

FIG. 10 is a time-base waveform diagram showing changes in an amplitude level, with respect to time, of a data signal received by receiving apparatus 1B of FIG. 9. With reference to FIG. 10, logic circuit 7B converts the amplitude levels of the data signal using points 20 to 23 into ternary signals and determines, based on the converted ternary signals, which of the binary signal to output. With reference to FIG. 10, when the amplitude levels of the data signal is the middle level at the binary discrimination timings A and B, logic circuit 7B converts the single-ended converted data signal into the respective ternary signals H, M, or L each indicating each of the three amplitude levels at the ternary discrimination timings W, X, and Y, binary discriminates the data signal, based on the converted ternary signals, and outputs the binary signal. Alternatively, when the amplitude level of the single-ended signal is the middle level at least at the binary discrimination timing B, logic circuit 7B may convert the single-ended signal at the ternary discrimination timings W, X, and Y into the respective ternary signals, binary discriminate the single-ended signal, based on the converted ternary signals, and output the binary signal.

3. Advantageous Effect

Compared to above-described receiving apparatus 1A according to the second exemplary embodiment, in receiving apparatus 1B in the present exemplary embodiment, logic circuit 7B converts the data signal into a fourth signal and a fifth signal both indicating the respective three amplitude levels at the binary discrimination timing A and the binary discrimination timing B, respectively, selects the binary signal having the lower bit error rate, based on the converted fourth ternary signal and the fifth ternary signal, and outputs the selected binary signal.

Compared to above-described receiving apparatus 1 according to the first exemplary embodiment, with this configuration, receiving apparatus 1B can highly accurately determine a binary signal for differential signals regardless of whether the differential signals have a large skew or a small skew.

Fourth Embodiment

1. Configuration

Figure 11:
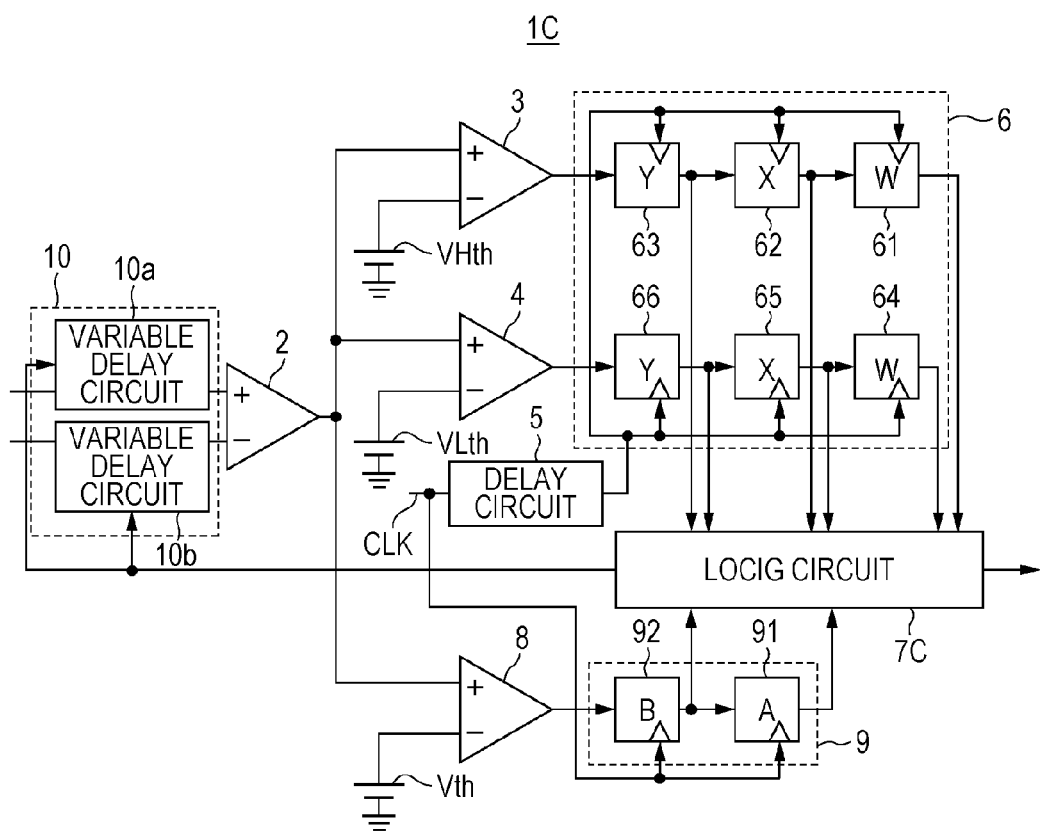
FIG. 11 is a block diagram showing structural elements of receiving apparatus 1C according to a fourth exemplary embodiment of the present disclosure.

FIG. 11 is a block diagram showing structural elements of receiving apparatus 1C according to a fourth exemplary embodiment of the present disclosure. Compared to receiving apparatus 1A of FIG. 7, receiving apparatus 1C of FIG. 11 is equipped with logic circuit 7C instead of logic circuit 7A, and is further equipped with variable delay unit 10. Variable delay unit 10 includes variable delay circuits 10a and 10b and is located in a prior stage of comparator 2, to which the differential signals are input, and which single-ended converts the input differential signals into the above single-ended signal.

With reference to FIG. 11, variable delay unit 10 adjusts a differential signal skew of differential signals by adjusting the timings at which the differential signals are input to comparator 2. Specifically, variable delay circuit 10a delays the timing at which the positive signal of the differential signals is input to comparator 2, and variable delay circuit 10b delays the timing at which the negative signal of the differential signals is input to comparator 2. The timings at which the positive signal and the negative signal of the differential signals are input to comparator 2 are both delayed in the present exemplary embodiment; however, a variable delay circuit may be provided only on one of the inputs to adjust the differential signal skew.

Logic circuit 7C is different from logic circuit 7A according to the second exemplary embodiment in that variable delay circuits 10a and 10b are controlled to adjust the differential signal skew of the differential signals. Specifically, logic circuit 7C adjusts each of the timing at which the positive signal of the differential signals is input to comparator 2 and the timing at which the negative signal of the differential signals is input to comparator 2 so that the differential signal skew of the differential signals is adjusted.

2. Operation

An operation of receiving apparatus 1C according to the fourth embodiment configured as described above is different from above-described receiving apparatus 1A according to the second exemplary embodiment in that receiving apparatus 1C can adjust the magnitude of the differential signal skew of the differential signals.

3. Advantageous Effect

Compared to above-described receiving apparatus 1A according to the second exemplary embodiment, in the present exemplary embodiment, receiving apparatus 1C is further equipped with delay circuit unit 10 in a prior stage of comparator 2, and delay circuit unit 10 adjusts the timings at which the differential signals are input to comparator 2, and logic circuit 7C controls delay circuit unit 10 so that the differential signal skew of the differential signals are adjusted.

With this configuration, an adjustment can be made so that the binary signal latched by shift register circuit 9 is preferentially output. Therefore, it is possible to increase a differential mode component to make it easy to receive the binary signal, and it is possible to reduce a common mode to reduce radiation noise.

OTHER EXEMPLARY EMBODIMENTS

As examples of the technique to be disclosed in the present application, the first to fourth exemplary embodiments are described above. However, the technique of the present disclosure is not limited to those exemplary embodiments and can also be applied to embodiments in which modification, replacement, addition, or removal is appropriately done. Further, it is possible to combine the structural elements described in the above first to fourth exemplary embodiments to make a new embodiment.

For example, comparator 2 receives the differential signals through a direct-current connection in the above-described exemplary embodiments; however, the present disclosure is not limited to this configuration. For example, coupling capacitors may be further provided in a prior state of comparator 2 to cut the direct-current components of the differential signals. Also in this case, the same advantageous effect as in the above-described exemplary embodiments can be obtained.

Further, the binary signal is determined, in the above-described exemplary embodiments, by using the result at the ternary discrimination timing W, which is one interval prior to the ternary discrimination timing X, when the amplitude level is the middle (M) level at the ternary discrimination timing X and the amplitude level is the middle (M) level at the ternary discrimination timing Y; however, the present disclosure is not limited to this operation. For example, when the binary signal at the binary discrimination timing A can be determined, the determined binary signal may be used to determine the binary signal at the binary discrimination timing B.

In the above-described exemplary embodiment, the clock signal obtained by delaying the clock signal CLK is input to respective registers 61 to 66; however, the present disclosure is not limited to this configuration. For example, the clock signal obtained by delaying the clock signal CLK may be input to respective registers 91 and 92. In this case, the ternary discrimination timings W, X, and Y are generated by the clock signal CLK, and the binary discrimination timings A and B are generated by the clock signal obtained by delaying the clock signal CLK.

As described above, the exemplary embodiments are described as examples of the technique of the present disclosure. For this purpose, the accompanying drawings and the detailed description are provided.

Therefore, the structural elements described in the accompanying drawings or the detailed description may not only include structural elements essential to solve the problem but include, to exemplify the above technique, structural elements inessential to solve the problem. For this reason, it should not be directly recognized, based on the fact that those inessential structural elements are described in the accompanying drawings or the detailed description, that those inessential structural elements are essential.

Because the above-described exemplary embodiments are for exemplifying the technique of the present disclosure, modification, replacement, addition, removal, and the like are possible without departing from the scope of the claims or the equivalent thereof.

As described above, receiving apparatus according to a first aspect receives differentially converted differential signals, determines, at a first binary discrimination timing, a binary signal for the differential signals by using a voltage level between a voltage level corresponding to logical value 0 and a voltage level corresponding to logical value 1 as a reference level Vth, and outputs the binary signal. The receiving apparatus is equipped with: a differential amplifier that receives the above differential signals and single-ended converts the received differential signals into a data signal; and a logic circuit that converts the single-ended converted data signal into respective ternary signals H, M, and L indicating three amplitude levels and determines the respective binary signals for the above data signal, based on the first ternary signal converted at a first ternary discrimination timing between the above first binary discrimination timing and a timing one unit interval prior to the above first binary discrimination timing and also based on a second ternary signal converted at a ternary discrimination timing Y between the above first binary discrimination timing and a timing one unit interval after the above first binary discrimination timing.

Therefore, it is possible to highly accurately determine a binary signal for differential signals having a large skew without adding a high-spec device that operates at a speed higher than an operating frequency of a common binary transmission.

In a receiving apparatus according to a second aspect, the above logic circuit determines, in the receiving apparatus according to the first aspect, the binary signal indicating logical value 0 or logical value 1 for the above data signal, based on a third ternary signal converted at a third ternary discrimination timing between a second binary discrimination timing one unit interval prior to the first binary discrimination timing and a timing one unit interval prior to the second binary discrimination timing, and outputs the binary signal.

Therefore, even when the binary signal 0 or 1 cannot be determined based on the first ternary signal and the second ternary signal, the binary signal can be determined for the data signal further based on the third signal; thus, the binary signal can be highly accurately determined for the differential signals having a large skew.

Receiving apparatus according to a third aspect is further equipped, in the receiving apparatus according to the first aspect or the second aspect, with a first comparator that receives the above data signal, compares an amplitude level of the received data signal with a first threshold level between the above reference level and the above voltage level corresponding to logical value 1, and outputs the comparison result as the first comparison result signal; and a second comparator that receives the above data signal, compares the amplitude level of the received data signal with the second threshold level between the above reference level and the above voltage level corresponding to logical value 0, and outputs the comparison result as the second comparison result signal. The above logic circuit converts the above data signal into the above respective ternary signals, based on the above first comparison result signal and the above second comparison result signal.

With this configuration, it is possible to highly accurately determine a binary value for differential signals having a large skew without adding a high-spec device that operates at a speed higher than an operating frequency of a common binary transmission.

The receiving apparatus according to a fourth aspect is further equipped, in the receiving apparatus of any one of the first aspect to the third aspect, with a shift register circuit that latches and holds each of the above first comparison result signal and each of the above second comparison result signal.

In the receiving apparatus according to a fifth aspect, the above shift register circuit is equipped, in the receiving apparatus according to the fourth aspect, with a first register that latches and holds the above first comparison result signal at the above first ternary discrimination timing, a second resister that latches and holds the above second comparison result signal at the above first ternary discrimination timing, a third register that latches and holds the above first comparison result signal at the above second ternary discrimination timing, a fourth register that latches and holds the above second comparison result signal at the above second ternary discrimination timing, a fifth register that latches and holds the above first comparison result signal at the above third ternary discrimination timing, and a sixth register that latches and holds the above second comparison result signal at the above third ternary discrimination timing.

Therefore, it is possible to highly accurately determine a binary value for differential signals having a large skew without adding a high-spec device that operates at a speed higher than an operating frequency of a common binary transmission.

A receiving apparatus according to a sixth aspect is further equipped, in the receiving apparatus according to any one of the first to fifth aspect, with a third comparator that receives the above data signal and compares amplitude level of the received data signal with the above reference level and outputs the result of the comparison as the third comparison result signal, and the above logic circuit determines a binary signal indicating logical value 0 or logical value 1 for the above data signal, based on the above third comparison result signal.

Therefore, the receiving apparatus can select between the binary signal by the binary discrimination and the binary signal by the ternary discrimination. Thus, the receiving apparatus can determine the binary signal even for the differential signals having a smaller skew.

In a receiving apparatus according to a seventh aspect, when the above receiving apparatus receives, in the receiving apparatus according to the sixth aspect, the above differential signals obtained by differentially converting the training signal in which the voltage level corresponding to logical value 1 and the voltage level corresponding to logical value 0 are alternately repeated every one unit interval, the above logic circuit selects and outputs the binary signal having the lower bit error rate, based on the bit error rates of the above data signal based on the above training signal.

Therefore, compared to the above-described receiving apparatus according to the first aspect, the receiving apparatus can receive a more appropriate binary signal, based on the bit error rate of the received training signal; thus, it is possible to highly accurately determine the binary signal for the differential signals regardless of whether the differential signals have a large skew or a small skew.

In a receiving apparatus according to an eighth aspect, the above training signal includes, in the receiving apparatus according to the seventh aspect, a signal of a voltage level corresponding to logical value 0 or a voltage level corresponding to logical value 1 that lasts longer than one unit interval.

Therefore, the receiving apparatus can detect when the training signal is received, and can thus detect a time to measure the bit error rate.

In a receiving apparatus according to a ninth aspect, the above logic circuit converts, in the receiving apparatus according to any one of the sixth to eighth aspects, the above data signal into a fourth ternary signal and a fifth ternary signal indicating three amplitude levels at each of the above first binary discrimination timing and the above second binary discrimination timing; and the above logic circuit selects and outputs the binary signal having the lower bit error rate, based on the converted fourth and fifth ternary signals.

Therefore, compared to the receiving apparatus according to the first aspect, the receiving apparatus can more highly accurately determine the binary signal for the differential signals regardless of whether the differential signals have a large skew or a small skew.

A receiving apparatus according to a tenth aspect is further equipped, in the receiving apparatus according to any one of the first to ninth aspects, with a delay circuit unit in a prior stage of the above differential amplifier; the above delay circuit unit adjusts a timing at which the above differential signals are input to the above differential amplifier; and the above logic circuit controls the above delay circuit unit to adjust the differential signal skew of the above differential signals.

Therefore, an adjustment can be made so that the binary signal latched by shift register circuit is preferentially output. Therefore, it is possible to increase a differential mode component for easy reception of the binary signal and at the same time to reduce a common mode for reduction of radiation noise.

In the present disclosure, logic circuits 7 and 7A to 7C may be implemented as a semiconductor integrated circuit (IC) or an LSI. The LSI or IC can be integrated into one chip, or also can be a combination of plural chips. For example, functional blocks other than a memory may be integrated into one chip. The name used here is LSI or IC, but it may also be called system LSI, VLSI (very large scale integration), or ULSI (ultra large scale integration) depending on the degree of integration. A Field Programmable Gate Array (FPGA) that can be programmed after manufacturing an LSI or a reconfigurable logic device that allows reconfiguration of the connection or setup of circuit cells inside the LSI can be used for the same purpose.

Further, it is also possible that all or a part of the functions or operations of the logic circuits 7 and 7A to 7C are implemented by executing software. In such a case, the software is recorded on one or more non-transitory recording media such as a ROM, an optical disk or a hard disk drive, and when the software is executed by a processor, the software causes the processor together with peripheral devices to execute the functions specified in the software. A system or apparatus may include such one or more non-transitory recording media on which the software is recorded and a processor together with necessary hardware devices such as an interface.

The present disclosure can be applied to a receiving apparatus that has a function of receiving a binary signal and receives high-speed differential signals. Specifically, for example, the present disclosure can be applied to a signal transmission system that uses a cable generating a large differential signal skew such as an HDMI (registered trademark) cable for connecting a TV set and a recorder.

What is claimed is:

1. A receiving apparatus comprising:
a differential amplifier adapted to receive differential signals having been differentially converted to single-ended convert the received differential signals into a single-ended signal; and
a logic circuit adapted to:

ternary discriminate an amplitude level of the single-ended signal at a first ternary discrimination timing that is between a first binary discrimination timing included in a plurality of binary discrimination timings at one unit interval and a timing one unit interval prior to the first binary discrimination timing;

ternary discriminate an amplitude level of the single-ended signal at a second ternary discrimination timing that is between the first binary discrimination timing and a timing one unit interval after the first binary discrimination timing;

binary discriminate an amplitude level of the single-ended signal at the first binary discrimination timing, by using the results of the ternary discriminations of the amplitude level of the single-ended signal at the first ternary discrimination timing and the second ternary discrimination timing; and output a binary signal corresponding to the result of the binary discrimination.

2. The receiving apparatus of claim 1, wherein the logic circuit is adapted to determine:

logical value 0 as a binary value for the amplitude level of the single-ended signal at the first binary discrimination timing when the result of the ternary discrimination of the amplitude level of the single-ended signal at the first ternary discrimination timing is an L1 level and when the result of the ternary discrimination of the amplitude level of the single-ended signal at the second ternary discrimination timing is the L1 level;

logical value 0 as a binary value for the amplitude level of the single-ended signal at the first binary discrimination timing when the result of the ternary discrimination of the amplitude level of the single-ended signal at the first ternary discrimination timing is the L1 level and when the result of the ternary discrimination of the amplitude level of the single-ended signal at the second ternary discrimination timing is an M level;

logical value 0 as a binary value for the amplitude level of the single-ended signal at the first binary discrimination timing when the result of the ternary discrimination of the amplitude level of the single-ended signal at the first ternary discrimination timing is the M level and when the result of the ternary discrimination of the amplitude level of the single-ended signal at the second ternary discrimination timing is the L1 level;

logical value 1 as a binary value for the amplitude level of the single-ended signal at the first binary discrimination timing when the result of the ternary discrimination of the amplitude level of the single-ended signal at the first ternary discrimination timing is the M level and when the result of the ternary discrimination of the amplitude level of the single-ended signal at the second ternary discrimination timing is an H1 level;

logical value 1 as a binary value for the amplitude level of the single-ended signal at the first binary discrimination timing when the result of the ternary discrimination of the amplitude level of the single-ended signal at the first ternary discrimination timing is the H1 level and when the result of the ternary discrimination of the amplitude level of the single-ended signal at the second ternary discrimination timing is the M level; and logical value 1 as a binary value for the amplitude level of the single-ended signal at the first binary discrimination timing when the result of the ternary discrimination of the amplitude level of the single-ended signal at the first ternary discrimination timing is the H1 level and when the result of the ternary discrimination of the amplitude level of the single-ended signal at the second ternary discrimination timing is the H1 level, where a reference level is a voltage level between a voltage level corresponding to logical value 0 and a voltage level corresponding to logical value 1;

a first threshold level is a voltage level between the reference level and the voltage level corresponding to logical value 1;

a second threshold level is a voltage level between the reference level and the voltage level corresponding to logical value 0;

the H1 level is a range between the voltage level corresponding to logical value 1 and the first threshold level;

the M level is a range between the first threshold level and the second threshold level; and the L1 level is a range between the second threshold level and the voltage level corresponding to logical value 0.

3. The receiving apparatus of claim 1, wherein the logic circuit is adapted to ternary discriminate the amplitude level of the single-ended signal at a third ternary discrimination timing between a second binary discrimination timing one unit interval prior to the first binary discrimination timing and a timing one unit interval prior to the second binary discrimination timing, and the logic circuit is adapted to binary discriminate the amplitude level of the single-ended signal at the first binary discrimination timing, by using the results of the ternary discriminations of the amplitude level of the single-ended signal at the first, second, and third ternary discrimination timings.

4. The receiving apparatus of claim 2, wherein the logic circuit is adapted to ternary discriminate the amplitude level of the single-ended signal at a third ternary discrimination timing between a second binary discrimination timing one unit interval prior to first binary discrimination timing and a timing one unit interval prior to the second binary discrimination timing, and the logic circuit is adapted to determine:

logical value 1 as a binary value for the amplitude level of the single-ended signal at the first binary discrimination timing when the result of the ternary discrimination of the amplitude level of the single-ended signal at the third ternary discrimination timing is the L1 level, when the result of the ternary discrimination of the amplitude level of the single-ended signal at the first ternary discrimination timing is the M level, and when the result of the ternary discrimination of the amplitude level of the single-ended signal at the second ternary discrimination timing is the M level; and logical value 0 as a binary value for the amplitude level of the single-ended signal at the first binary discrimination timing when the result of the ternary discrimination of the amplitude level of the single-ended signal at the third ternary discrimination timing is the H1 level, when the result of the ternary discrimination of the amplitude level of the single-ended signal at the first ternary discrimination timing is the M level, and when the result of the ternary discrimination of the amplitude level of the single-ended signal at the second ternary discrimination timing is the M level.

5. The receiving apparatus of claim 4, further comprising:

a first comparator adapted to receive the single-ended signal, compare an amplitude level of the received single-ended signal with the first threshold level, and output a result of the comparison as a first comparison result signal; and a second comparator adapted to receive the single-ended signal, compare the amplitude level of the received single-ended signal with the second threshold level, and output a result of the comparison as a second comparison result signal,
wherein the logic circuit ternary is adapted to discriminate the amplitude level of the single-ended signal, by using the first comparison result signal and the second comparison result signal.

6. The receiving apparatus of claim 5, wherein the logic circuit is adapted to determine:
the H1 level as a ternary value for the amplitude level of the single-ended signal when the first comparison result signal indicates an H2 level and the second comparison result signal indicates an H3 level;
the M level as a ternary value for the amplitude level of the single-ended signal when the first comparison result signal indicates an L2 level and the second comparison result signal indicates the H3 level; and
the L1 level as a ternary value for the amplitude level of the single-ended signal when the first comparison result signal indicates the L2 level and the second comparison result signal indicates an L3 level,
where the H2 level is a range between the voltage level corresponding to logical value 1 and the first threshold level;
the L2 level is a range between the first threshold level and the voltage level corresponding to logical value 0;
the H3 level is a range between the voltage level corresponding to logical value 1 and the second threshold level; and
the L3 level is a range between the second threshold level and the voltage level corresponding to logical value 0.

7. The receiving apparatus of claim 6, further comprising a shift register circuit adapted to latch and holds each of the first comparison result signal and the second comparison result signal, wherein the logic circuit is adapted to ternary discriminate the amplitude level of the single-ended signal, by using the latched first comparison result signal and the latched second comparison result signal.

8. The receiving apparatus of claim 7, wherein the shift register circuit comprises:
a first register adapted to latch and hold the first comparison result signal corresponding to the amplitude level of the single-ended signal at the first ternary discrimination timing;
a second resister adapted to latch and hold the second comparison result signal corresponding to the amplitude level of the single-ended signal at the first ternary discrimination timing;
a third register adapted to latch and hold the first comparison result signal corresponding to the amplitude level of the single-ended signal at the second ternary discrimination timing;
a fourth register adapted to latch and hold the second comparison result signal corresponding to the amplitude level of the single-ended signal at the second ternary discrimination timing;
a fifth register adapted to latch and hold the first comparison result signal corresponding to the amplitude level of the single-ended signal at the third ternary discrimination timing; and
a sixth register adapted to latch and hold the second comparison result signal corresponding to the amplitude level of the single-ended signal at the third ternary discrimination timing, and wherein the logic circuit is adapted to ternary discriminate the amplitude level of the single-ended signal, by using the latched first comparison result signal and the latched second comparison result signal.

9. The receiving apparatus of claim 1, further comprising:
a third comparator adapted to receive the single-ended signal, compare an amplitude level of the received single-ended signal with a reference level, and output a result of the comparison as a third comparison result signal,
wherein the logic circuit is adapted to binary discriminates the single-ended signal at the first binary discrimination timing, by using the third comparison result signal.

10. The receiving apparatus of claim 9, wherein, when the receiving apparatus receives differential signals obtained by differentially converting a training signal including a signal in which a voltage level corresponding to logical value 1 and a voltage level corresponding to logical value 0 are alternately repeated every one unit interval, the logic circuit is adapted to perform, on the single-ended signal obtained by single-ended converting the training signal, binary discrimination by using the results of the ternary discriminations and binary discrimination by using the third comparison result signal, and select a setting for outputting the binary signal having a lower bit error rate, based on bit error rates of these binary discriminations.

11. The receiving apparatus of claim 10, wherein the training signal includes a signal of a voltage level corresponding to logical value 0 that lasts for a period longer than one unit interval or a voltage level corresponding to logical value 1 that lasts for a period longer than one unit interval.

12. The receiving apparatus of claim 1, further comprising:
a third comparator adapted to receive the single-ended signal, compare an amplitude level of the received single-ended signal with a reference level, and output a result of the comparison as a third comparison result signal,
wherein the logic circuit is adapted to output, by using at least the result of the ternary discrimination of the amplitude level of the single-ended signal at the first binary discrimination timing, one of the binary signal based on the third comparison result signal and the binary signal based on the results of the ternary discriminations of the amplitude level of the single-ended signal at the first ternary discrimination timing and the second ternary discrimination timing.

13. The receiving apparatus of claim 1, further comprising:
a delay circuit unit in a prior stage of the differential amplifier,
wherein the delay circuit unit is adapted to adjust timings at which the differential signals are input to the differential amplifier, and the logic circuit is adapted to control the delay circuit unit to adjust a differential signal skew of the differential signals.

14. The receiving apparatus of claim 4, wherein the logic circuit is adapted to binary discriminate and determine, when the results of the ternary discriminations of the amplitude level of the single-ended signal at the first, second, and third ternary discrimination timings are all the M level, that the amplitude level of the single-ended signal at the first binary discrimination timing has the same logical value as the amplitude level of the single-ended signal at the second binary discrimination timing.

* * * * *